(12) United States Patent
Schuetze et al.

(10) Patent No.: US 12,549,221 B2
(45) Date of Patent: Feb. 10, 2026

(54) BUS STATION, BUS SYSTEM, AND METHOD FOR TRANSMITTING DATA IN A TWO-WIRE BUS SYSTEM

(71) Applicant: Robert Bosch GmbH, Stuttgart (DE)

(72) Inventors: Norman Schuetze, Reutlingen (DE); Thomas Walker, Kusterdingen (DE); Balint Nagy, Vecsés (HU); Matthias Renner, Weil Der Stadt (DE); Michael Gerlach, Weil Der Stadt (DE); Stephan Voehringer, Lichtenstein (DE)

(73) Assignee: ROBERT BOSCH GMBH, Stuttgart (DE)

( * ) Notice: Subject to any disclaimer, the term of this patent is extended or adjusted under 35 U.S.C. 154(b) by 114 days.

(21) Appl. No.: 18/562,715

(22) PCT Filed: May 24, 2022

(86) PCT No.: PCT/EP2022/064002
§ 371 (c)(1),
(2) Date: Nov. 20, 2023

(87) PCT Pub. No.: WO2022/253630
PCT Pub. Date: Dec. 18, 2022

(65) Prior Publication Data
US 2024/0250717 A1    Jul. 25, 2024

(30) Foreign Application Priority Data
May 31, 2021  (DE) .................. 10 2021 205 523.0

(51) Int. Cl.
*H04B 3/54*    (2006.01)

(52) U.S. Cl.
CPC ............ *H04B 3/548* (2013.01); *H04B 3/542* (2013.01); *H04B 2203/5416* (2013.01); *H04B 2203/547* (2013.01)

(58) Field of Classification Search
CPC ............ H04B 3/548; H04B 2203/5416; H04B 2203/547; H04B 3/542; H04B 3/54; B60L 50/60; H02J 7/0063
See application file for complete search history.

(56) References Cited

U.S. PATENT DOCUMENTS

| | | | |
|---|---|---|---|
| 2013/0043908 A1* | 2/2013 | Hammerschmidt | ..... H04Q 9/00 327/87 |
| 2014/0358377 A1* | 12/2014 | Hammerschmidt | ........................ G01R 31/2829 702/182 |

(Continued)

FOREIGN PATENT DOCUMENTS

| | | |
|---|---|---|
| DE | 19503460 C1 | 3/1996 |
| DE | 102014015308 A1 | 4/2016 |

(Continued)

OTHER PUBLICATIONS

DSI3 Bus Standard, Revision 1.00, Feb. 16, 2011 (Year: 2011).*
International Search Report for PCT/EP2022/064002, Issued Oct. 10, 2022.

*Primary Examiner* — Aristocratis Fotakis
(74) *Attorney, Agent, or Firm* — NORTON ROSE FULBRIGHT US LLP

(57) ABSTRACT

A bus station, a two-wire bus system, and methods for transmitting data in a two-wire bus system. The method includes: supplying a variable battery voltage to a first bus station and a second bus station, and transmitting data from the first bus station to the second bus station using a modulation signal that is superposed on the variable battery voltage, wherein the modulation signal is adjusted to follow a level of the variable battery voltage in a predefined manner.

10 Claims, 4 Drawing Sheets

(56) References Cited

U.S. PATENT DOCUMENTS

| | | | |
|---|---|---|---|
| 2017/0050588 A1* | 2/2017 | Hammerschmidt | B60R 16/023 |
| 2017/0201294 A1* | 7/2017 | Kanazawa | H04B 3/54 |
| 2020/0207219 A1* | 7/2020 | Slepchenkov | B60L 58/12 |
| 2020/0304172 A1 | 9/2020 | Yano | |
| 2021/0211067 A1* | 7/2021 | Kumar | H02M 1/0093 |

FOREIGN PATENT DOCUMENTS

| | | |
|---|---|---|
| DE | 102008044147 B4 | 2/2021 |
| JP | 2006352396 A | 12/2006 |
| JP | 2011223257 A | 11/2011 |
| JP | 2014146905 A | 8/2014 |

* cited by examiner

BUS STATION, BUS SYSTEM, AND METHOD FOR TRANSMITTING DATA IN A TWO-WIRE BUS SYSTEM

FIELD

The present invention relates to a bus station, a bus system and a method for transmitting data in a two-wire bus system. In particular, the present invention relates to bus systems which are fed by way of battery technology (in particular island bus systems) and are supplied with a variable (fluctuating) DC voltage.

BACKGROUND INFORMATION

In the related art, bus systems that enable the information exchange of control devices by means of comparatively low wiring effort are available in particular in automotive and aeronautical applications. In particular for the wired connection of the control devices, there is the possibility of distributing information and energy for operating the bus stations via the bus line. In the related art, the modulation methods are usually defined independently of a current magnitude of the supply voltage. For example, the levels 0 volts and 5 volts are defined in order to communicate different characters (low/high) using fixed, predefined voltages. In today's bus systems, such as PSI5, the master control device can transmit only at low data rates to the bus stations while simultaneously supplying voltage to the bus stations, since the sync pulse architecture is used for this purpose. In the case of DSI3, the modulation voltage relates to a constant supply voltage, which requires a voltage regulator for the supply of the bus stations in the master control device.

SUMMARY

The present invention provides a method for transmitting data in a two-wire bus system. The two-wire bus system can be understood as a galvanically/electrically switching bus system. In particular, two control devices are in this case connected to one another only via two wires, via which they carry out the information exchange and are electrically supplied with energy. According to an example embodiment of the present invention, in a first step, a first bus station and a second bus station are supplied with energy at a variable battery voltage. The reason for which the battery voltage varies is irrelevant to the present invention. However, the battery voltage is a voltage that is basically designed as a DC voltage and can have dips or be subject to fluctuations depending on the operating state. The data exchange from the first bus station to the second bus station now takes place using a modulation signal superposed on the variable battery voltage. However, the modulation signal does not have a level predefined relative to the ground but is adjusted to follow the level of the variable battery voltage in a predefined manner. In particular, the variable battery voltage can be used to use predefined voltage dips relative to the variable battery voltage for encoding the data to be transmitted. A high level is here defined by subtracting a low voltage from the variable battery voltage, while a low level is represented by subtracting a higher predefined voltage from the variable battery voltage. In this way, the modulation signal "floats" as a function of a current level position of the variable battery voltage with the latter. In this case, all bus stations can be permanently supplied with the variable battery voltage and also detect the influences of the variable battery voltage on the position of the AC modulation signal. The receiving bus stations can receive the received data by means of an AC voltage decoupling of the modulation signal with subsequent digital conversion via a comparator with variable threshold following. The data can be created by means of "Manchester encoding." The data can be transmitted, for example, at up to 125 kbits/s. Due to the modulation signals floating with the variable battery voltage signal, an additional voltage regulator in the transmitting (in particular master) control device for the supply of the bus stations can be dispensed with according to the present invention. The master operates at a variable modulation voltage which is obtained, for example, directly from the battery voltage via a control stage and driver stage. The actual level position of the variable battery voltage is thus not relevant to decoding the data as long as the predefined differences between high level and low level of the modulation signal are satisfied. In particular, a swing between low level and high level can be predefined and can float with the variable battery voltage.

Preferred developments of the present invention are disclosed herein.

The battery voltage can advantageously additionally be filtered, in order to suppress interferences in the frequency range of the voltage modulation according to an example embodiment of the present invention. This does not mean that the (slowly) varying battery voltage is kept constant or supported in the conventional sense. In this way, a simple structure and secure communication can be provided.

The remaining bus stations (single stations or slaves) can, if necessary, have their own voltage regulators in order to generate constant operating voltages from the variable battery voltage or from the variable battery voltage modulated in the manner according to the present invention.

The present invention can in particular be understood such that the current voltage level of the battery voltage, which (slowly) varies over time, rather than 0 volt, is used as a reference level for the voltage swing of the modulation signal. A difference between the variable battery voltage (unmodulated supply voltage) and a high level of the modulated bus signal (modulation signal) can thus be kept constant over time. The high levels of the modulation signal are thus coupled to the unmodulated signal of the supply voltage (variable battery voltage) at a fixed offset (difference). Alternatively or additionally, the difference between the high level and the low level of the modulation signal can be kept constant. Provided that all communication pairs within the two-wire bus system are provided with a similar variable battery voltage, the variable battery voltage can also be used for the restoration or reception of the data from the modulation signal/bus signal.

Optionally, according to an example embodiment of the present invention, a mean value or an operating point of the modulation swing can be "suspended" at a predefined offset below the variable battery voltage. In other words, the central position of the modulation signal $(U_{\_mod\_high} + U_{\_mod\_low}) \times \frac{1}{2}$ is adjusted to follow a respectively current level of the variable battery voltage at an offset fixed over time.

All bus stations (master and all slaves) present in the two-wire bus system can preferably be supplied with energy by one and the same battery. This battery can provide the variable battery voltage. With a sufficiently short length (in particular <20 m) of the bus system, it is thereby ensured that all control devices receive a bus voltage that is sufficiently identical for the transmission and proper reception of the data.

According to an example embodiment of the present invention, the modulation signal can, for example, be derived from the variable battery voltage by means of a predefined modulation resistor. In this case, for generating the modulation signal, a predefined current for a high level is drawn through the modulation resistor, in order to tap the high level between the modulation resistor and the current source connected to the electrical ground. In a corresponding manner, a higher predefined current is drawn by means of the current source and/or a further current source through the modulation resistor, in order to tap the low level between the modulation resistor and the current source or the current sources. In this way, the respectively transmitting control device draws the bus voltage selectively to a high level or to a low level, in order to transmit data via the bus. Otherwise, the respective current sources of the respective control device are switched off.

The modulation signal can preferably be generated from the variable battery voltage by means of a control stage and a driver stage. For this purpose, according to an example embodiment of the present invention, the control stage compares the target modulation voltage to the actual modulation voltage after the driver output stage and keeps the control deviation small. Technically, a small control deviation, which results from the voltage drop in the driver output stage, remains. In other words, this control deviation is the difference between the variable battery voltage and the high level of the modulation signal due to the voltage drop in the driver output stage. According to the technical design of the driver output stage as a push-pull stage, which can be realized, for example, as unipolar transistors with low resistance between the drain and the source in the switched-on state of the transistor or by bipolar transistors with low saturation residual voltage, the voltage drop and thus the remaining control deviation can be kept small, as a result of which the high level of the modulation signal is as high as possible.

The two-wire bus system according to the present invention does not require a voltage regulator in the first bus station (master). As a result of the modulation principle according to the present invention, the unregulated voltage position is not a problem in the modulation and demodulation of data communicated via the two-wire bus system. In this way, costs can be saved and the complexity of the first bus station/bus system can be reduced.

According to a second aspect of the present invention, a bus station is provided for use as a first bus station in a method as described above. According to an example embodiment of the present invention, the first bus station has a two-wire bus connection for communicating with the bus stations and for obtaining a variable battery voltage. The remaining bus stations are supplied with energy by means of the first bus station and are addressed by the data modulated to the variable battery voltage. In this case, the first bus station is configured to adjust the modulation signal to follow a level of the variable battery voltage in a predefined manner. In other words, the high levels and low levels of the modulation signal float "below the surface" of the variable battery voltage.

According to a third aspect of the present invention, a bus system is provided which has a first bus station according to the aforementioned aspect of the present invention and at least one second bus station which is connected to the first bus station by means of a two-wire line. The features, feature combinations and the resulting advantages obviously correspond to those listed above in conjunction with the first and second aspects of the present invention, such that reference is made to these aspects in order to avoid repetitions.

BRIEF DESCRIPTION OF THE DRAWINGS

Exemplary embodiments of the present invention are described in detail below with reference to the figures.

DETAILED DESCRIPTION OF EXAMPLE EMBODIMENTS

Figure 1:
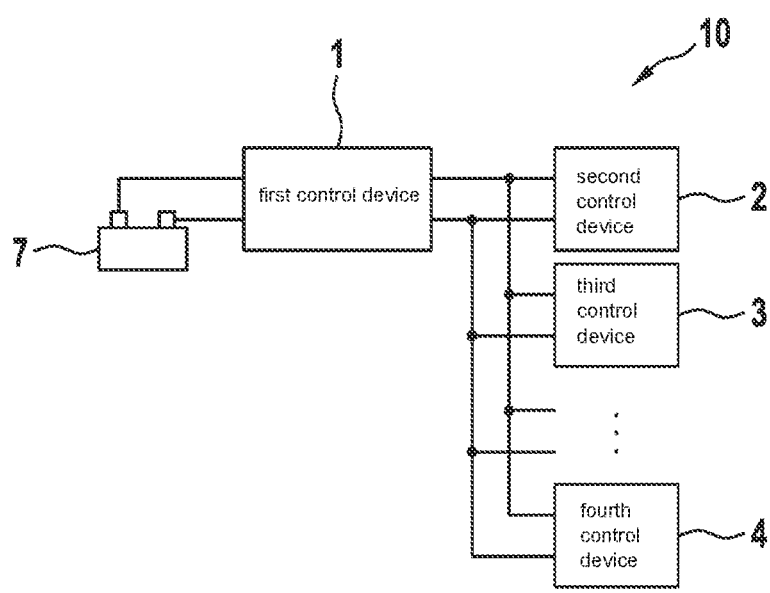
FIG. 1 shows a schematic representation of a two-wire bus system according to an exemplary embodiment of the present invention.

FIG. 1 shows a schematic representation of a two-wire bus system 10, in which a first control device 1 in the form of a master is supplied with a variable battery voltage via a battery 7. The first control device 1 is configured to supply a second control device 2, a third control device 3 and a fourth control device 4 with the variable battery voltage from the battery 7 and to transmit data to the control devices 2, 3, 4 as bus stations.

The two-wire bus system 10 can be provided, for example, in a passenger car, a transporter, a truck, an aircraft and/or a watercraft. The on-board power supply voltage can be 12 volts, 24 volts, 48 volts or also 400 volts or 800 volts. A component of receiving and decoding the voltage-modulated Manchester coding within the control devices 2, 3, 4 is an AC voltage decoupling of the modulation signal with subsequent digital conversion via a comparator with variable threshold following.

Figure 6:
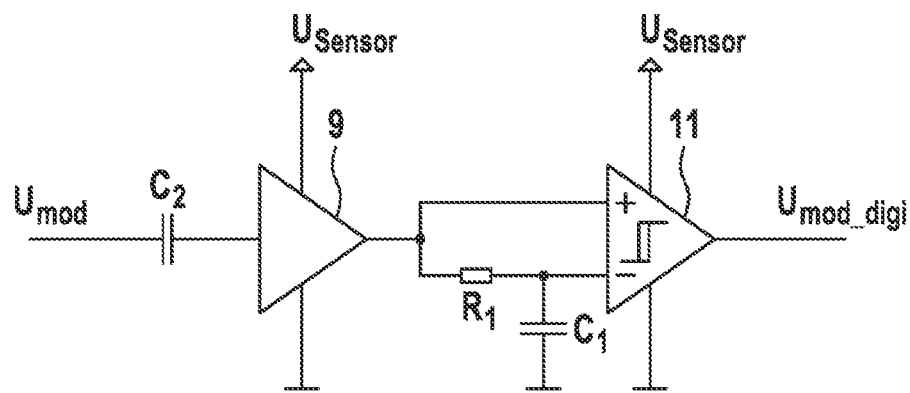
FIG. 6 shows a basic circuit of an assembly in a receiver path of a bus station of a bus system according to the present invention.

The assemblies required for this purpose are presented in conjunction with FIG. 6.

Figure 2:
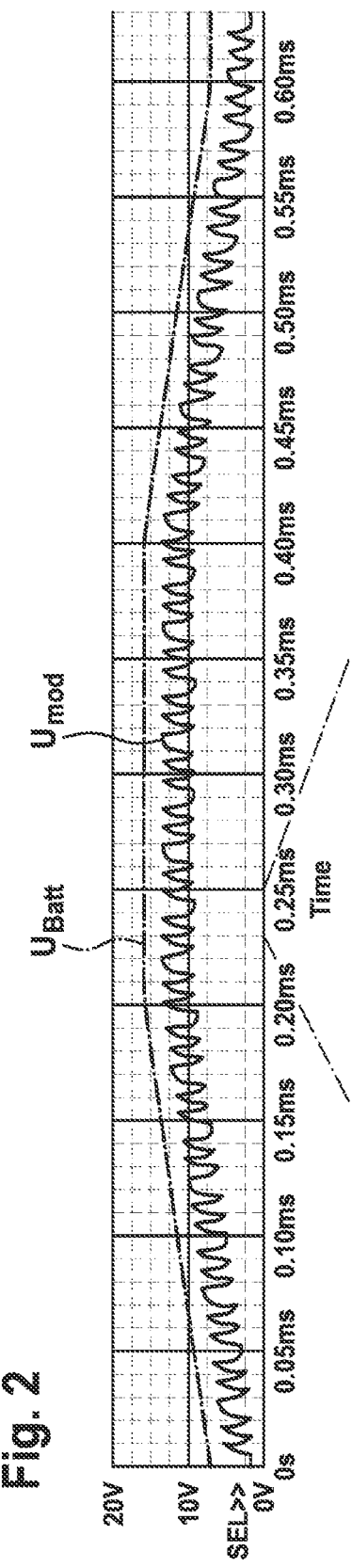
FIG. 2 shows a voltage-time diagram illustrating a variable battery voltage $U_{Batt}$ and a modulated voltage $U_{mod}$.

FIG. 2 shows a voltage-time diagram of a variable battery voltage $U_{Batt}$. Between 0 seconds and 0.20 ms, the variable battery voltage $U_{Batt}$ increases from approximately 7 volts to approximately 16.5 volts and decreases again to approximately 7 volts from approximately 0.4 ms.

Since a fixed modulation voltage or a Δ between high level and low level could only have an extremely low resolution in such a voltage swing, a modulation signal $U_{mod}$ is quasi-equidistantly "suspended" from the variable battery voltage $U_{Batt}$ in the manner according to the present invention. In other words, in the range between 0.20 ms and 0.40 ms, low levels corresponding to one another at 0 seconds vary from approximately 1.5 volts to just 10 volts (low level) and high levels corresponding to one another at 0 seconds vary from 5 volts to approximately 13.5 volts (high level). In other words, in a first (initial) time range, a low level of the modulation signal $U_{mod}$ is clearly lower than a corresponding low level of the modulation signal $U_{mod}$ at a later point in time. Moreover, a high level in a first time segment is defined to be significantly lower than a low level at a later point in time. In other words, all levels of the modulation signal $U_{mod}$ in a first time range (e.g., at 0 seconds) are defined to be lower than the low and high levels in a second (later) time range (from approximately 0.2 ms). The reverse applies to the second time range and a subsequent third time range from 0.50 ms, in which the low and high levels correspond to the first time range. However, the voltage swing of the modulation signal $U_{mod}$ from a low level to a directly following high level remains constant at approximately 3 volts over the entire time range (first to third time range). Accordingly, between the variable battery voltage $U_{Batt}$ and a high level of the modulation signal $U_{mod}$ also remains constant over time (approximately 3 volts). Finally, a difference between the variable battery voltage $U_{Batt}$ and a low level of the superposed modulation signal $U_{mod}$ also remains constant over time at approximately 6 volts.

Figure 3:
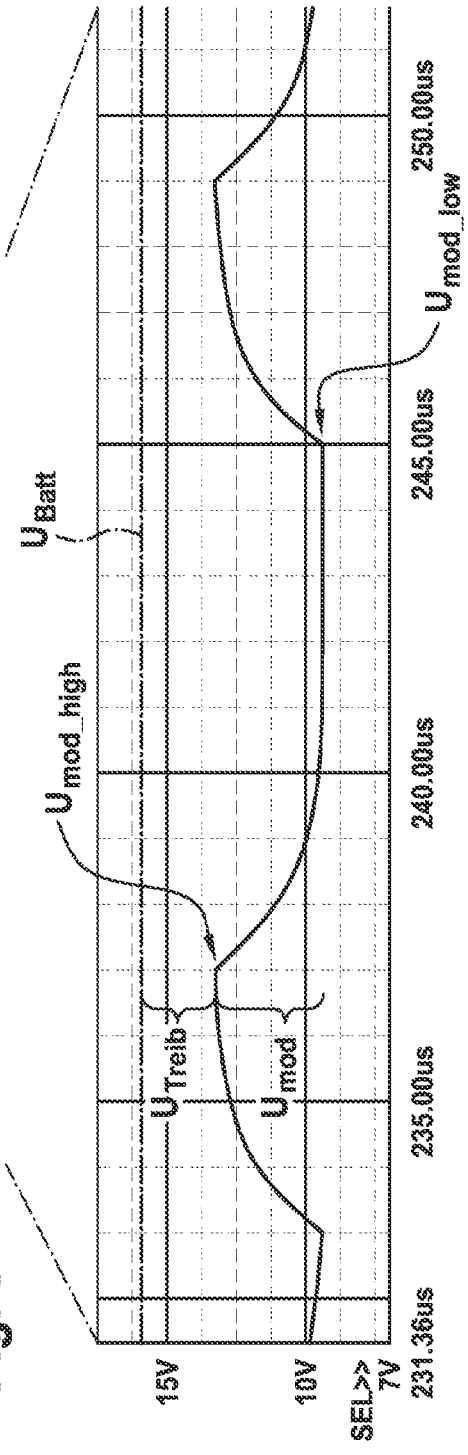
FIG. 3 shows an enlarged detail of the voltage-time diagram of FIG. 2.

FIG. 3 shows a detail of the voltage-time diagram shown in FIG. 2, in which the relationships of the two voltage signals $U_{Batt}$ and $U_{mod}$ can be seen. While the filtered battery voltage $U_{Batt}$ in the time segment under consideration appears to be constant, the high level $U_{mod\_high}$ remains below $U_{Batt}$ by approximately 3 volts. This corresponds to the voltage drop across the driver output stage $U_{driver}$. In the lower value $U_{mod\_low}$, the modulated voltage corresponds to a freely selectable voltage of, for example, $U_{mod\_high}$–[0.5 volts to 2 volts]. Various voltage levels for the low level $U_{mod\_low}$ are also possible in order to thus enable even higher bit rates. For example, here, a first low level (not shown) of the difference of the high level reduced by 0.5 volts corresponds to a first symbol and a second low level of the difference of the high level reduced by 1 volts corresponds to a second symbol. The differential voltage or the modulation voltage swing can thus also advantageously be adapted to the line parameters and environmental influences of the bus, in order to adapt the robustness of the data transmission for a specific two-wire line system. It should be noted that the two voltage curves shown are not transmitted over the entire bus, but rather the variable battery voltage $U_{Batt}$ is, for example, provided to only the first control device 1, which propagates the modulation signal $U_{mod}$ via the two-wire line to the control devices 2, 3, 4 (see FIG. 1) for data transmission.

Figure 4:
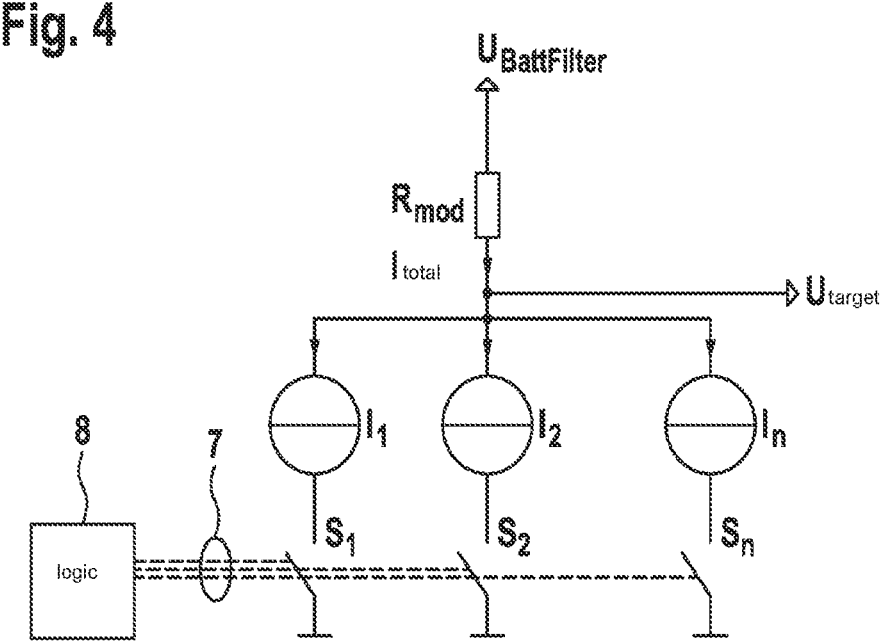
FIG. 4 shows a schematic representation of an exemplary embodiment of a bus station according to the present invention with controllable current sinks.

FIG. 4 shows a schematic representation of components for generating a variable modulation voltage on the two-wire line (bus), for example by the first bus station (master) 1. Three controllable variable current sinks $I_1$, $I_2$ and $I_n$ are configured to be activated for modulation as needed by a logic 8 via respective switches $S_1$, $S_2$ $S_n$ and control lines 7. Through them, the digital (Manchester-coded) data stream is converted into a modulation current and finally into the variable target modulation voltage $U_{target}$. This results in the target modulation voltage $U_{target}$ as:

$$U_{target} = U_{BattFilter} - R_{mod} \times I_{total},$$

where $U_{BattFilter}$ is the filtered variable battery voltage, $R_{mod}$ is the ohmic resistance of the modulation resistor, and $I_{total}$ is the total current drawn through the modulation resistor $R_{mod}$ by the controllable current sources. The voltage signal $U_{target}$ is supplied to a control stage (shown in FIG. 5). Through temporally offset switching of the current sinks/current sources $I_1$, $I_2$, $I_n$, the temporal shape of the target voltage swing (pulse shaping) can be adapted if required. Any pulse shapes (e.g., rectangle, sine, triangle or "only" a flank deformation for reducing interference emissions) can thus be realized.

Figure 5:
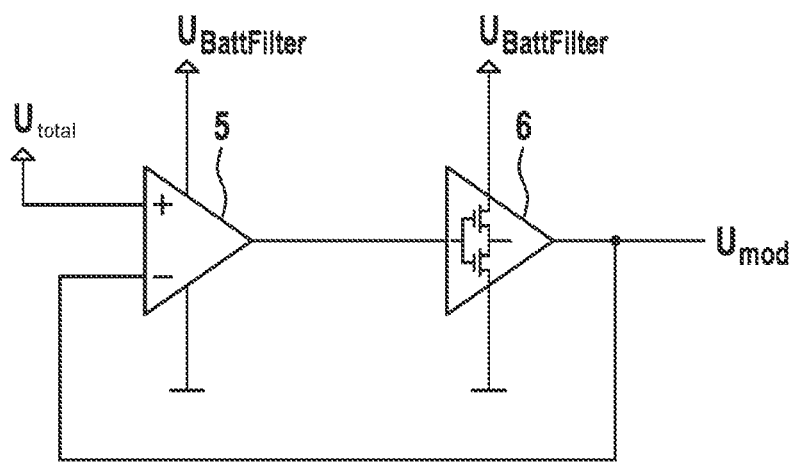
FIG. 5 shows a schematic representation of a control stage in conjunction with a driver stage of the exemplary embodiment of a bus station according to the present invention.

FIG. 5 shows a circuit comprising a control stage 5 and a driver stage 6 for use in a bus station (master) according to the present invention. The control stage 5 compares the target modulation voltage $U_{target}$ to the actual modulation voltage $U_{mod}$ after the driver output stage and keeps the control deviation small. Technically, a small control deviation, which results from the voltage drop in the driver stage 6, remains. According to the technical design of the driver stage 6 as a push-pull stage, for example with unipolar transistors with low source resistance or bipolar transistors with low saturation residual voltage, the voltage drop and thus the remaining control deviation can be kept small.

FIG. 6 shows a basic circuit of the AC voltage coupling and the subsequent digital conversion in a receiver path of a control device (in particular slave) when only two different voltage levels (high and low) are transmitted. During the transmission of only two voltage levels, the control devices 2, 3, 4 require, for example, a simple circuit structure on the receiver side, in order to free the modulation voltage $U_{mod}$ from the mean variable DC voltage component (AC voltage decoupling). Subsequently, a voltage adaptation of the, for example Manchester-coded, AC voltage signal, which is symmetrical with respect to 0 volts, to the input voltage range of the following comparator 11 takes place. The AC voltage decoupling takes place by an AC voltage decoupler 9 and a capacitor $C_2$. The filter network between the AC voltage decoupler 9 and the comparator 11 comprises a low-pass filter comprising an ohmic resistor $R_1$ and a capacitor $C_1$. The comparator 11 is responsible for the digitization of the modulation signal $U_{mod}$, wherein its switching threshold is also generated directly from the low-pass-filtered modulation signal. The comparator outputs the digitized modulation signal $U_{mod\_digi}$. The voltage supply $U_{sensor}$ of the AC voltage decoupler 9 and of the comparator 11 is realized, for example, from the modulation voltage via the voltage regulators present in the AC voltage decoupler 9 and comparator 11.

Figure 7:
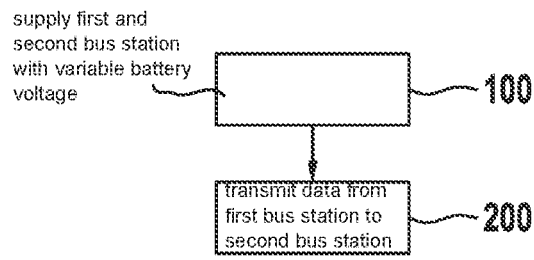
FIG. 7 shows a flow chart illustrating steps of an exemplary embodiment of a method according to the present invention for data transmission in a two-wire bus system.

FIG. 7 shows steps of an exemplary embodiment of a method according to the present invention for data transmission in a two-wire bus system. In a first step 100, the method comprises supplying a first bus station (master) and a second bus station (slave) with a variable battery voltage. The battery voltage is to be understood as a DC voltage signal with a magnitude that (slowly) varies over time. In this case, the variable battery voltage can deviate from its minimum voltage upward, for example by 20%, 40%, 60% or more. In a second step 200, data are transmitted from the first bus station (master) to the second bus station (slave) using a modulation signal superposed or embedded into the variable battery voltage. The modulation signal is adjusted to follow a level of the variable battery voltage in a predefined manner. In other words, "the modulation signal is equidistantly suspended from a respective level of the variable battery voltage." While the variable battery voltage is supplied to the first bus station (master), the first bus station (master) transmits the modulation signal via the two-wire line to the second bus station and further bus stations.

The present invention simplifies the voltage generation in the master control device for the sensors on the bus, enables a data transmission from the master control device to the bus stations, which data transmission is at least up to six times higher in comparison to, for example, the currently known generation of parking sensors in the related art and allows uninterrupted operation of the sensors without temporarily storing energy in the bus stations during the communication. This simplifies the structure and eliminates the need for hardware that was always required in the related art.

The invention claimed is:

1. A method for transmitting data in a two-wire bus system, comprising the following steps:
   supplying a first bus station and a second bus station with a variable battery voltage; and
   transmitting data from the first bus station to the second bus station using a modulation signal superposed on the variable battery voltage, wherein the modulation signal is adjusted to follow a level of the variable battery voltage in a predefined manner,
   wherein the modulation signal comprises a high level defined by subtracting a first predefined voltage from the variable battery voltage, and a low level defined by subtracting a second, higher predefined voltage from the variable battery voltage, such that the modulation signal floats with the variable battery voltage.

2. The method according to claim 1, wherein a difference: (i) between the variable battery voltage and high levels of the modulation signal and/or (ii) between the high levels and low levels of the modulation signal, is kept constant.

3. A method for transmitting data in a two-wire bus system, comprising the following steps:
   supplying a first bus station and a second bus station with a variable battery voltage; and
   transmitting data from the first bus station to the second bus station using a modulation signal superposed on the variable battery voltage, wherein the modulation signal is adjusted to follow a level of the variable battery voltage in a predefined manner,
   wherein a mean value of the modulation signal is adjusted to follow the variable battery voltage at a predefined offset.

4. The method according to claim 1, wherein all bus stations present in the two-wire bus system are supplied by a battery, which provides the variable battery voltage.

5. The method according to claim 1, wherein the modulation signal is derived from the variable battery voltage using a modulation resistor, through which a current that is predefined for generating the modulation signal flows.

6. A method for transmitting data in a two-wire bus system, comprising the following steps:
   supplying a first bus station and a second bus station with a variable battery voltage; and
   transmitting data from the first bus station to the second bus station using a modulation signal superposed on the variable battery voltage, wherein the modulation signal is adjusted to follow a level of the variable battery voltage in a predefined manner,
   wherein the modulation signal is derived from the variable battery voltage using a modulation resistor, through which a current that is predefined for generating the modulation signal flows,
   wherein a desired voltage swing between a high level and a low level of the modulation signal is generated using a plurality of current sources between the modulation resistor and an electrical ground.

7. The method according to claim 1, wherein the modulation signal is generated from the variable battery voltage using a control stage and a driver stage.

8. The method according to claim 1, wherein no voltage regulator is present in the first bus station.

9. A bus station for use as a first bus station, comprising:
   a two-wire bus terminal configured for communication and to obtain a variable battery voltage;
   wherein the first bus station is configured to supply a second bus station with energy via the two-wire bus terminal using the variable battery voltage, and to transmit a modulation signal, superposed on the variable battery voltage, to the second bus station, wherein the first bus station is further configured to adjust the modulation signal to follow a level of the variable battery voltage in a predefined manner,
   wherein the modulation signal comprises a high level defined by subtracting a first predefined voltage from the variable battery voltage, and a low level defined by subtracting a second, higher predefined voltage from the variable battery voltage, such that the modulation signal floats with the variable battery voltage.

10. A bus system, comprising:
    a first bus station, including:
       a two-wire bus terminal configured for communication and to obtain a variable battery voltage,
       wherein the first bus station is configured to supply a second bus station with energy via the two-wire bus terminal using the variable battery voltage, and to transmit a modulation signal, superposed on the variable battery voltage, to the second bus station, wherein the first bus station is further configured to adjust the modulation signal to follow a level of the variable battery voltage in a predefined manner; and
    a second bus station connected to the first bus station using a two-wire line,
    wherein the modulation signal comprises a high level defined by subtracting a first predefined voltage from the variable battery voltage, and a low level defined by subtracting a second, higher predefined voltage from the variable battery voltage, such that the modulation signal floats with the variable battery voltage.

* * * * *